April 26, 1949.  W. LIBEN  2,468,676

LEVEL INDICATING DEVICE FOR FLUENT MATERIALS

Filed April 20, 1945

Inventor
WILLIAM LIBEN

By Herman L. Gordon
Attorney

Patented Apr. 26, 1949

2,468,676

UNITED STATES PATENT OFFICE 2,468,676

LEVEL INDICATING DEVICE FOR FLUENT MATERIALS

William Liben, New York, N. Y., assignor to Premier Crystal Laboratories, Incorporated, New York, N. Y.

Application April 20, 1945, Serial No. 589,363

7 Claims. (Cl. 177—311)

This invention relates to indicating devices, and more particularly, to devices for indicating the level of material in a container.

A main object of the invention is to provide a novel and improved level indicating device operating in accordance with thermal principles.

A further object of the invention is to provide an improved structure for indicating whether or not the level of a liquid or solid material in a container is higher or lower than a predetermined level.

A still further object of the invention is to provide an improved structure for indicating the absolute level of a liquid or solid material in a container, as, for example, oil in an engine crankcase, fuel in a tank, wheat in a grain elevator, sugar in a barrel, and the like.

Further objects and advantages of the invention will appear from the following description and claims, and from the accompanying drawings, wherein:

If a body "A" is placed in space and supplied with heat from an appropriate source so that it constantly contains a given amount of heat, it will assume an equilibrium temperature which is a function of its thermal capacity. The heat input to maintain the body at this temperature is given by:

Heat input=loss (radiation plus conduction plus convection)

If now, without otherwise changing the conditions, we place another body in contact with "A," such as "B," the steady-state temperature of the combined bodies will change because the heat loss is now different in magnitude while the heat input has not changed. Therefore the system must stabilize at a new temperature.

The following analysis of a simplified case will illustrate. Suppose "A" is a cube of face area $a$, with constant heat input Q, immersed in air; then Q=heat loss (radiation plus conduction plus convection)

The conduction loss is zero.
The radiation loss is given by:

Radiation loss=$6aek$ $(T^4-T_0^4)$ where $e$=emissivity
$k$=Stefan-Boltzmann radiation constant
$T$=absolute temperature of the body
$T_0$=absolute temperature of the surroundings The convection loss is given by:

Convection loss=$6ab$ $(T-T_0)^{5/4}$ where $b$ is a constant.
We may now write $$Q=6aek\ (T^4-T_0^4)+6ab\ (T-T_0)^{5/4} \quad (1)$$

If now a second body "B," of the same dimensions as "A" is placed in contact with "A," the steady state condition will be given by $$Q=10aek\ (T_1^4-T_0^4)+10ab\ (T_1-T_0)^{5/4} \quad (2)$$

where $T_1$ is the new temperature of the system.

A comparison of Equations 1 and 2 shows that $T$ must be greater than $T_1$.

Therefore it is apparent that the contact with or removal of a body with respect to a standard reference body may be detected by the change in steady-state temperature of said standard reference body which is receiving a fixed quantity of heat per unit of time.

Figure 1:
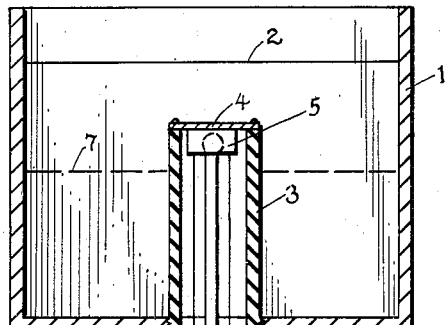
Figure 1 is a diagrammatic sectional view of a liquid level indicator structure in accordance with this invention.

Referring to Figure 1, an application of the above principle to a liquid level indicator is disclosed wherein I designates a tank containing a liquid at a normal level 2. Provided in tank I is a cylindrical housing 3, having a top plate 4. Secured to plate 4 within housing 3 is an electrical heater element 5 which emits heat at a constant rate. A thermometer 6 is provided in housing 3, arranged to measure the temperature of plate 4.

Under steady-state conditions $$Q=Ah\ (T_4-T_L)+Ab\ (T_4-T_L)^{5/4} \quad (3)$$

where

Q=heat input from electric heater 5
A=area of plate 4
$h$=surface conductance of surface 4 to the liquid
$T_4$=temperature of plate 4

$T_L$ = temperature of the surrounding liquid
$b$ = a constant

The first term on the right represents the heat losses by conduction and the second term represents the losses by convection.

If now the liquid level drops to the level indicated by the dotted line 7, the resultant steady-state condition will be as follows:

$$Q = Ab'(T_4' - T_L)^{5/4} + Aek(T_4'^4 - T_L^4) \quad (4)$$

The first term on the right now represents the heat loss by convection, and, since it is now air which carries the heat from surface 4, the constant $b'$ is used in place of $b$, and $T_4'$ is the temperature of plate 4. The second term on the right is the radiation loss, wherein $e$ and $k$ are the same as in Equation 1.

Comparing Equations 3 and 4 it is at once obvious that $T_4$ will not equal $T_4'$ in general. The condition that $T_4$ equals $T_4'$ could only come about by very special engineering design. Ordinarily, the change in temperature of plate 4 resulting from the change in liquid level, such as from the level at 2 to the level at 7, will produce a substantial change in the reading of thermometer 6, especially if a sensitive thermometer is employed.

The height of the liquid level above plate 4 may be measured by the thermometer reading since the heat losses of plate 4 when covered by the liquid will depend upon the thickness of the liquid layer covering plate 4. As the thickness of the liquid layer covering plate 4 decreases, the temperature $T_4$ will increase relatively slowly, and when the liquid level drops below plate 4 a relatively sharp rise in temperature will occur. Therefore, the slow temperature change may be used as a measure of liquid level, and the sharp change may be used as an indication that the liquid level has reached the level of plate 4.

Plate 4 may be thermally insulated with respect to the walls of the tank by forming the wall portions adjacent to plate 4 of material of low heat conductivity, such as plastic, or any other well known suitable heat insulating material.

Figure 2A:
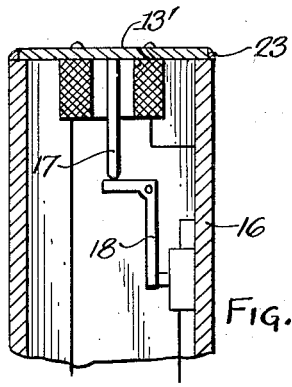
Figure 2a is a detail sectional view showing a modification of the structure of Figure 2.
Figure 2:
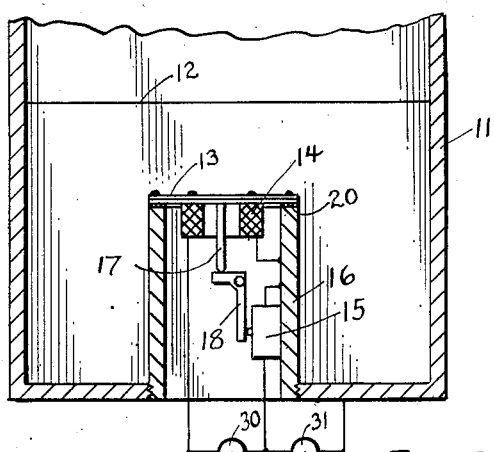
Figure 2 is a diagrammatic sectional view of a liquid level indicator structure according to this invention adapted to be used as an oil level indicator in an automobile crankcase.

In Figure 2 is shown a form of this invention adapted to be used as an oil level indicator in an automobile crankcase. 11 designates the oil pan of the crankcase and 16 is a cylindrical housing for the indicator device. Housing 16 is provided with a bimetal circular top plate 13 which functions as a temperature-sensitive element. 14 is a heater coil supplying heat at a constant rate to plate 13. A flat ring-shaped gasket 20 of suitable resilient oil and heat-resistant material is interposed between plate 13 and housing 16. Plate 13 carries a depending pin member 17 rigidly secured to its central portion, the lower end of pin 17 being normally in contact with one arm of a lever 18 pivotally mounted in housing 16. The other arm of lever 18 is adapted to actuate a contact-opening member of a switch 15 when said lever 18 is rotated by downward movement of pin 17.

Heater 14 is connected to the automobile battery 22 through the ignition switch 19. Connected in series across ignition switch 19 and battery 22 are a low resistance blue lamp 30 and a high resistance red lamp 31. Switch 15 is connected between the junction between lamps 30 and 31 and ground, said battery 22 being grounded at one terminal thereof, as shown in Figure 2.

When the oil is at normal level, such as at 12 in Figure 2, switch 15 is closed. Red lamp 31 is then dark and blue lamp 30 is energized. When the oil level drops low enough to expose bimetal plate 13 the temperature of said bimetal plate rises, causing said bimetal plate to warp and to move pin 17 downwardly to rock lever 18 and to thereby open the contacts of switch 15. The battery voltage is then impressed across lamps 30 and 31 in series, but since red lamp 31 has a substantially higher resistance than blue lamp 30, red lamp 31 is illuminated, whereas blue lamp 30 becomes dark. The red signal indicates that the oil level has dropped below a safe level, said safe level being substantially the level of bimetal plate 13 in the oil pan.

Although the temperature responsive element employed in the structure of Figure 2 is a bimetallic plate, it has been found that a result substantially equivalent to that obtained by said structure can also be obtained by employing a homogeneous metal plate in place of plate 13 in Figure 2, provided that the temperature coefficient of expansion of the substituted metal plate is substantially different from that of tube 16, and also provided that the plate is rigidly secured at its peripheral edges to the top of tube 16. Also, gasket 20 may be omitted and the plate may be welded directly to the top of tube 16. This modification of the structure of Figure 2 is shown in Figure 2a, wherein 13' is the plate of homogeneous metal secured at its peripheral edges by a continuous weld 23 to the top rim of tube 16. The metal of plate 13' has a substantially different temperature coefficient of expansion from that of tube 16, whereby a result substantially equivalent to that of the structure of Figure 2 will be obtained.

Figure 3:
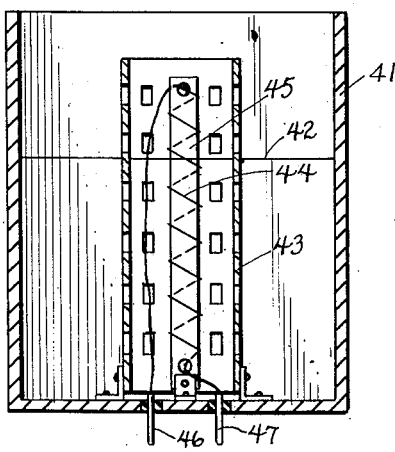
Figure 3 is a vertical cross-sectional view of a fluid container employing a further embodiment of a fluid level indicator in accordance with this invention.

A further embodiment of this invention which incorporates the same basic principle as employed in the embodiments of Figures 1 and 2 is shown in Figure 3. In Figure 3, 41 designates a fluid container, the fluid level of which is as shown, for example, at 42. A resistance wire 44 is mounted in said container, said resistance wire being wound on a support member 45 which is secured in vertical position in the container by appropriate brackets. A perforated protector sleeve 43 is provided in the container, said protector sleeve surrounding the resistor to protect said resistor against violent oscillations of the fluid. A pair of terminals 46 and 47 are provided, said terminals being connected respectively to the ends of resistance wire 44 and extending through appropriate insulating bushings to the exterior of container 41.

The resistance of wire 44 is given by:

$$\text{Resistance} = (L-H)R_T + HR_{T'} \quad (5)$$

where $L$ = total length of the resistance wire
$H$ = length of the resistance wire submerged in the liquid
$T$ = temperature of the portion of wire 44 exposed to the air
$T'$ = temperature of the portion of wire 44 submerged in the liquid
$R_T$ = wire resistance per unit length of wire at temperature $T$
$R_{T'}$ = wire resistance per unit length of wire at temperature $T'$ Also $$R_T = R_0(1 + \alpha T); \quad R_{T'} = R_0(1 + \alpha T') \quad (6)$$

where $\alpha$ = temperature coefficient of resistance of wire 44
$R_0$ = wire resistance per unit length of wire at zero temperature The total resistance may now be written as:

$$r = R_0(L-H)(1+\alpha T) + R_0 H(1+\alpha T') \quad (7)$$

or $$H = \frac{R_0 p(1+\alpha T) - r}{R_0 \alpha (T-T')} \quad (8)$$

For a given design of the instrument all of the quantities on the right side of Equation 8 will be fixed except $r$ which will vary as a function of $H$. $T$ and $T'$ may be made to have fixed values different from each other.

From Equation 8, therefore, in a particular design of the instrument $H$ may be calculated from a measurement of $r$. Any well known measuring means for determining $r$ may be employed, such as an ohmmeter, Wheatstone bridge, or the like. If an ohmmeter is employed it may be calibrated in terms of fluid level values and the instrument may thus be made direct reading.

Figure 4:
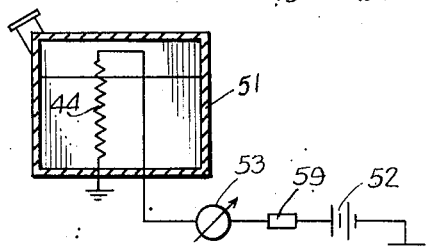
Figure 4 is a diagrammatic view of an electrical, automobile fuel tank level indicator system employing the structure of this invention.

A simplified fluid level gauge employing the resistance wire 44 of Figure 3 may be used, for example, as a fuel tank gauge in an automobile. Referring to Figure 4, such an arrangement is disclosed, wherein 51 is the fuel tank, 52 is the automobile battery, 59 is the ignition switch and 53 is an instrument having a current-responsive movement, such as an ammeter. As shown in Figure 4, these elements are connected in series. The current in the circuit will be substantially given by:

$$i = \frac{V}{R_0 L(1+\alpha T) - H R_0 \alpha (T-T')} \quad (9)$$

where $V$ is the voltage of battery 52. In a given design of the instrument the current will vary as a function of the fluid level $H$. The ammeter 53 may therefore be calibrated in terms of fluid level values and the instrument may thus be made self-reading.

In the form of the invention embodied in Figure 4 the rate at which the heat is supplied to the resistance wire is not strictly constant, but by proper initial calibration the instrument will function with satisfactory accuracy.

Although the above forms of this invention have been directed to liquid level indication, it is obvious that the structures disclosed may be used to measure levels of fluent solids such as sugar in a barrel, wheat in a grain elevator, or other granular materials in containers.

While certain specific embodiments of level indicating devices have been disclosed in the foregoing description, it will be understood that numerous modifications within the spirit of the invention may occur to those skilled in the art. Therefore, it is intended that no limitations be placed on the invention other than as defined by the scope of the appended claims.

What is claimed is:

1. Level-responsive means associated with a container for fluent materials, comprising a hollow member projecting upwardly from the bottom wall of the container, the exterior of said hollow member being exposed to the material in the container and the interior thereof being sealed off from said material, the top wall of said hollow member comprising a flat thermo-sensitive element adapted to deflect responsive to a change in temperature thereof, and means for continuously heating said flat element independently of the material in the container, whereby the flat element will change its temperature when the level of the material drops below said flat element.

2. Level-responsive means associated with a container for fluent materials comprising a hollow member projecting upwardly from the bottom wall of the container, the exterior of said hollow member being exposed to the material in the container and the interior thereof being sealed off from said material, the top wall of said hollow member comprising a thermo-sensitive plate element, said plate element being adapted to deflect responsive to a change in temperature thereof, and means independent of the material for continuously heating said plate element, whereby said plate element will change its temperature when the level of the material drops below said plate element.

3. An oil level-responsive device for the crankcase of an internal combustion engine comprising an upwardly projecting hollow member extending upwardly from the bottom wall of the crankcase, the exterior of said hollow member being exposed to the oil in the crankcase and the interior thereof being sealed off from the crankcase oil, the top wall of said hollow member comprising a thermo-sensiitve plate element adapted to deflect substantially responsive to a change in temperature thereof, and means for continuously heating the plate element independently of the oil, whereby the temperature of the plate element will change when the level of the oil drops below the plate element.

4. An oil level-responsive device for the crankcase of an internal combustion engine comprising an upwardly projecting hollow member extending upwardly from the bottom wall of the crankcase, the exterior of said hollow member being exposed to the oil in the crankcase and the interior thereof being sealed off from the oil, the top wall of said hollow member comprising a thermo-sensitive plate element adapted to deflect responsive to a change in temperature thereof, and means independent of the oil in the crankcase for continuously furnishing heat to said plate element, whereby the temperature of the plate element will change when the level of the oil drops below the plate element.

5. In a level responsive device associated with a container for fluent materials, a hollow member projecting inwardly from a wall of the container, the exterior of said hollow member being exposed to the material in the container and the interior thereof being sealed off from said material, one of the walls of said hollow member comprising a thermo-sensitive bimetallic plate adapted to deflect responsive to a change in temperature thereof, and a heater associated with said plate, the deflection of the plate taking place when the level of material changes adjacent said plate.

6. In a level responsive device associated with a container for fluent materials, a hollow member projecting inwardly from a wall of the container, the exterior of said hollow member being exposed to the material in the container and the interior thereof being sealed off from said material, one wall portion of the hollow member having a thermal coefficient of expansion which is substantially different from the thermal coefficient of expansion of the remainder of the hollow member, and a heater associated with said wall portion, deflection of said wall portion taking place when the level of material changes adjacent said wall portion.

7. In a level responsive device associated with a container for fluent materials, a hollow member projecting inwardly from a wall of the container, the exterior of said hollow member being exposed to the material in the container and the interior thereof being sealed off from said material, one wall of said hollow member having a thermosensitive portion adapted to deflect responsive to a change in temperature thereof, and a heater associated with said wall, deflection of said wall taking place when the level of material changes adjacent said wall.

WILLIAM LIBEN.

REFERENCES CITED

The following references are of record in the file of this patent:

UNITED STATES PATENTS

| Number | Name | Date |
|---|---|---|
| 1,823,397 | Guy | Sept. 15, 1931 |
| 1,909,712 | Oppegaard | May 16, 1933 |
| 2,165,569 | Obermaier | July 11, 1939 |
| 2,211,606 | Pratt | Aug. 13, 1940 |
| 2,304,211 | Sparrow | Dec. 8, 1942 |
| 2,342,827 | Ackers | Feb. 29, 1944 |
| 2,402,312 | Burch | June 18, 1946 |

FOREIGN PATENTS

| Number | Country | Date |
|---|---|---|
| 271,708 | Great Britain | June 2, 1927 |
| 366,663 | Great Britain | Feb. 11, 1932 |
| 381,811 | Great Britain | Oct. 13, 1932 |
| 513,427 | Great Britain | Oct. 12, 1939 |
| 622,247 | France | Feb. 21, 1927 |
| 678,618 | Germany | July 19, 1939 |